(12) United States Patent
Cronin

(10) Patent No.: US 11,860,049 B2
(45) Date of Patent: Jan. 2, 2024

(54) PORTABLE STRAIN GAUGE FOR IMPROVED IMPULSE AND PEAK FORCE DETECTION

(71) Applicant: Kiwi Texas, LLC, Lubbock, TX (US)

(72) Inventor: John Cronin, East Auckland (NZ)

(73) Assignee: Kiwi Texas, LLC, Lubbock, TX (US)

( * ) Notice: Subject to any disclaimer, the term of this patent is extended or adjusted under 35 U.S.C. 154(b) by 0 days.

(21) Appl. No.: 17/518,463

(22) Filed: Nov. 3, 2021

(65) Prior Publication Data

US 2022/0057278 A1    Feb. 24, 2022

Related U.S. Application Data

(63) Continuation of application No. 16/520,089, filed on Jul. 23, 2019, now Pat. No. 11,193,837, which is a continuation-in-part of application No. PCT/NZ2019/050003, filed on Jan. 23, 2019.

(30) Foreign Application Priority Data

Jan. 23, 2018   (NZ) ........................................ 739356

(51) Int. Cl.
*G01L 1/00* (2006.01)
*G01L 1/22* (2006.01)
*A63B 24/00* (2006.01)
*G01P 15/12* (2006.01)
*A63B 21/00* (2006.01)
*A63B 21/06* (2006.01)

(52) U.S. Cl.
CPC ........ *G01L 1/2287* (2013.01); *A63B 24/0062* (2013.01); *G01L 1/225* (2013.01); *G01L 1/2218* (2013.01); *A63B 21/0004* (2013.01); *A63B 21/06* (2013.01); *A63B 2225/50* (2013.01); *A63B 2230/60* (2013.01); *G01P 15/123* (2013.01)

(58) Field of Classification Search
CPC ..... G01L 1/2287; G01L 1/2218; G01L 1/225; A63B 24/0062; A63B 21/0004; A63B 21/06; A63B 2225/50; A63B 2230/60; G01P 15/123
USPC .......................................................... 73/63
See application file for complete search history.

(56) References Cited

U.S. PATENT DOCUMENTS

| | | | | |
|---|---|---|---|---|
| 4,919,418 | A * | 4/1990 | Miller .................. | A63B 21/154 482/901 |
| 8,911,328 | B2 * | 12/2014 | Alessandri ............. | G16H 20/30 482/901 |
| 10,426,989 | B2 * | 10/2019 | Dalebout ........... | A63B 21/0442 |
| 10,814,172 | B1 * | 10/2020 | Ilfrey .................. | A63B 23/035 |
| 10,940,360 | B2 * | 3/2021 | Dalebout ......... | A63B 23/03516 |

(Continued)

*Primary Examiner* — Max H Noori
(74) *Attorney, Agent, or Firm* — Fenwick & West LLP

(57) ABSTRACT

Systems and methods for evaluating the performance of an athlete using a strain gauge is described. In some embodiments, the measurement system comprises a strain gauge and a central processing device. The strain gauge can include a power source, an inertial measurement unit ("IMU") comprising a load cell, a microcontroller, and a wireless communication module. The strain gauge can be configured to output strain data at a rate of at least 1 kHz and the central processing device can be configured to receive the strain data transmitted from the wireless communication module.

21 Claims, 13 Drawing Sheets

(56) References Cited

U.S. PATENT DOCUMENTS

| | | | |
|---|---|---|---|
| 2005/0075586 A1* | 4/2005 | Jamsen | A61B 5/1118 600/595 |
| 2012/0220428 A1* | 8/2012 | Carlson | A63B 21/222 482/8 |
| 2013/0065730 A1* | 3/2013 | Camerota | A63B 24/0062 482/5 |
| 2022/0314077 A1* | 10/2022 | Bissonnette | A63B 24/0075 |

* cited by examiner

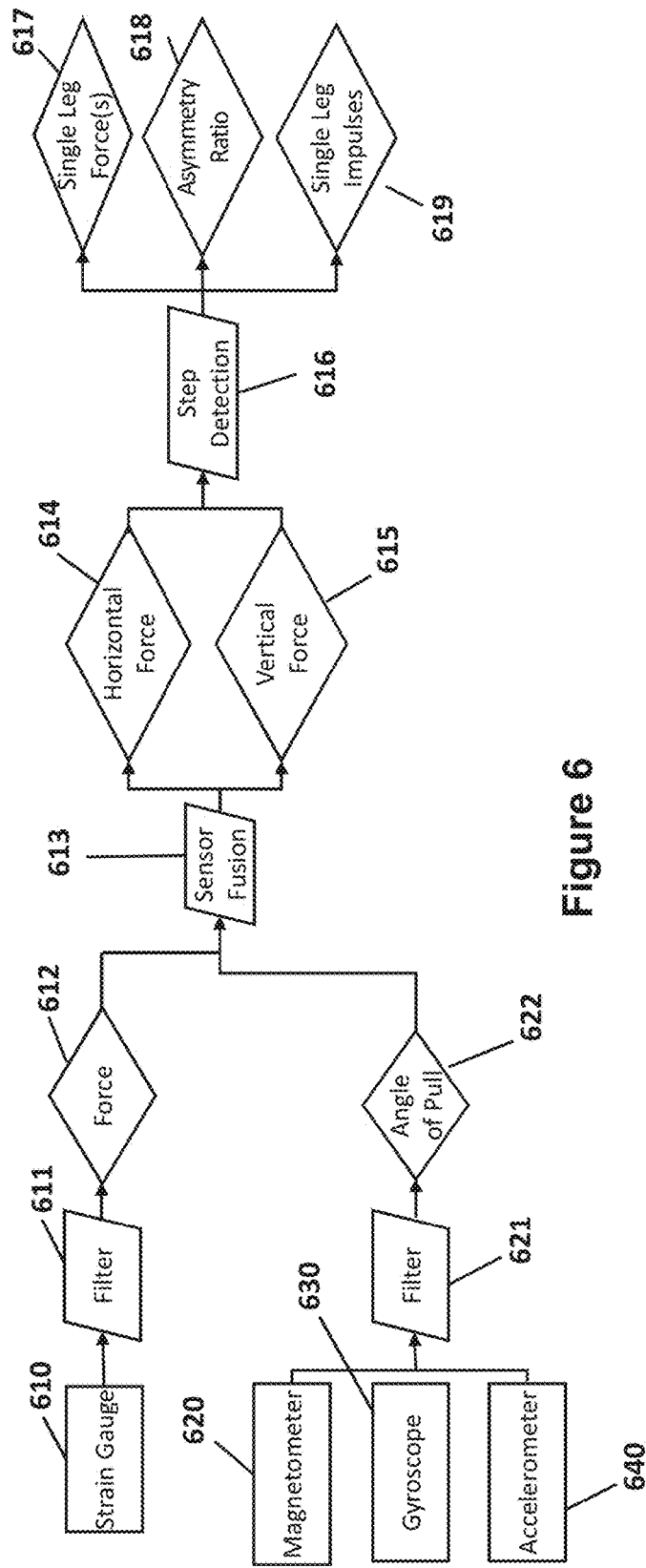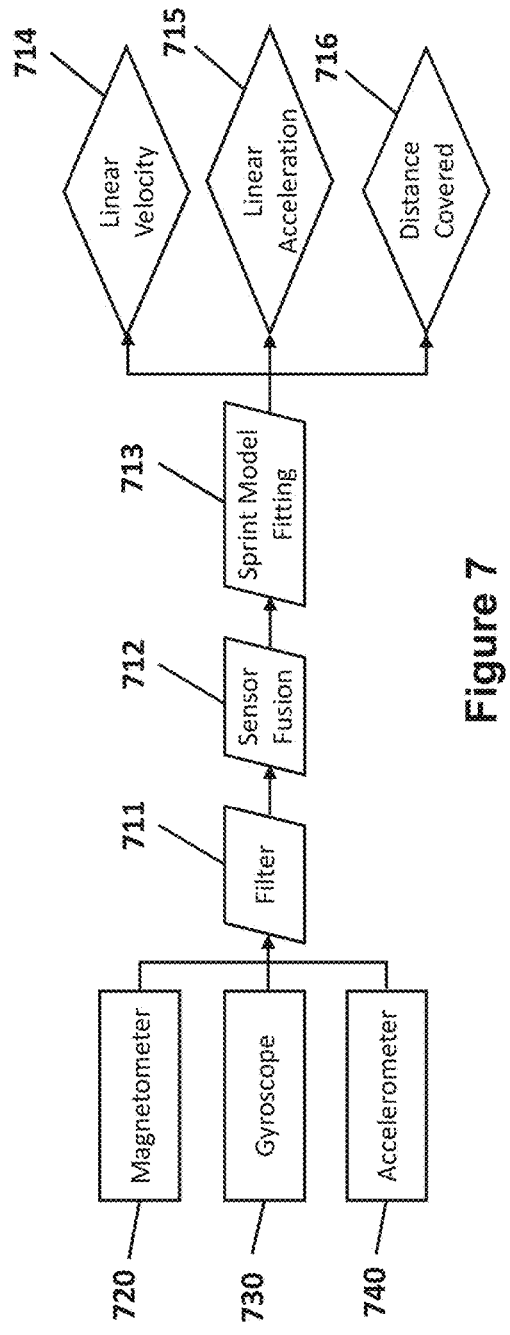
Figure 6
Figure 7

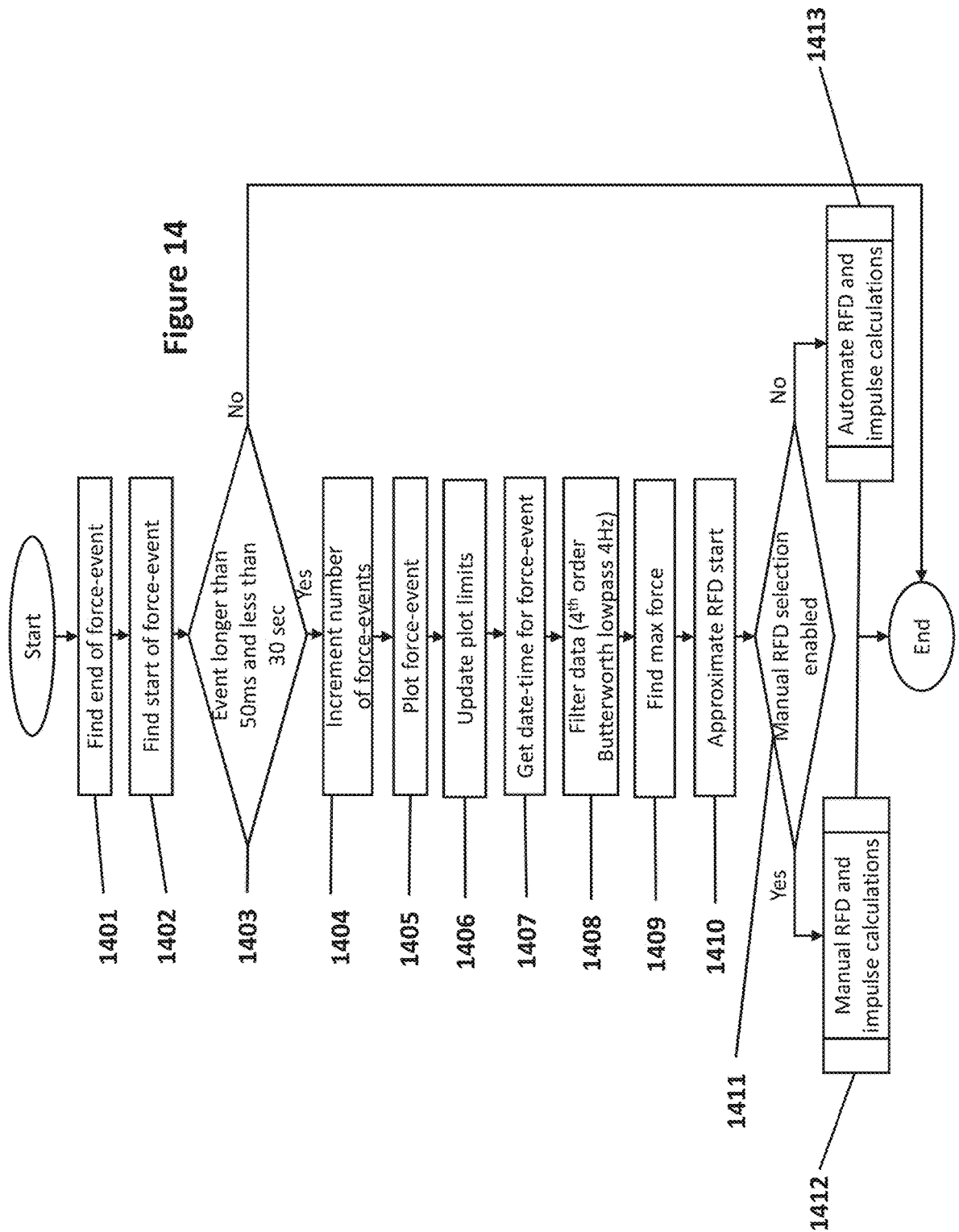

PORTABLE STRAIN GAUGE FOR IMPROVED IMPULSE AND PEAK FORCE DETECTION

CROSS REFERENCE TO RELATED APPLICATIONS

This application is a continuation of U.S. application Ser. No. 16/520,089, "Portable Strain Gauge for Improved Impulse and Peak Force Detection," filed Jul. 23, 2019; which is a continuation-in-part of International Application No. PCT/NZ2019/050003, filed Jan. 23, 2019; which claims priority to New Zealand Application No. 739356, filed Jan. 23, 2018. All of the foregoing is incorporated by reference in their entirety.

FIELD

This invention relates to strain gauge apparatuses, systems, and methods, and in particular, to portable strain gauges for improved impulse and peak force detection.

BACKGROUND

Unbalanced unilateral (single leg) horizontal force is linked to various type of injuries include hamstring, groin injury, hip flexor, knee ligament and lower back. Understanding unilateral horizontal force is also useful for training performance and monitoring. Such injuries commonly occur in athletes of many popular sport events in which high speed sprinting is frequently performed, including track and field events, football, and rugby. Injuries such as hip injury has a very high recurrence rate. In the English professional soccer/football leagues, hamstring strain injury reoccurred between 12% to 48% of the players. In addition, the persistence of the recurrence was reported to continue for many weeks after returning to play with cumulative recurrence risk of 31%. In many cases, hamstring injuries have led to considerable time lost from training and competition, which result in financial loss and diminished athletic performance.

Epidemiological data obtained from football, soccer, and rugby across several years indicates that hamstring injuries have not declined in recent decades. The average cost of a single acute hamstring injury in the Australian Football League based on player salary and time missed has been published and was greater than $45,000 NZD in 2012. Estimated costs for soccer players in the English Premier League are over 10 times higher (i.e. >$450,000 NZD per hamstring injury).

Despite the serious implications of hamstring injury, current methods such as instrumented treadmills, shoe sensors, isokinetic dynamometer and force plates are inadequate owing to high cost, limited data collection, limited portability, and the requirement for experienced data scientist operators to use the device.

An example of an instrumented treadmill is the Woodway which is between $30,000 to $50,000 NZD and it does not accommodate change in angle and it is often considered biomechanically different to over-ground sprinting. The attraction of the proposed device is not only injury prevention but also training performance and monitoring. The current solutions for unilateral force, in the context of training performance and monitoring, suffers from the same limitations as above—high cost, limited portability, and require specialized knowledge to operate. In summary, there is a market need for a cheaper and more accurate method of assessing injury risks, performance monitoring and improvement.

Devices used for assessing unilateral force production include instrumented treadmills, pressure sensors in shoes, accelerometers and multiple in-ground force plates. Instrumented treadmill have several advantages, including the ability to assess force production for several steps and accurate and reliable data. Instrumented treadmills, however, are costly, and require highly specialized knowledge for data analysis. Pressure sensors are easy to use, however have not proved to be useful for this purpose. Accelerometers are easy to use but have not been proven to be useful for unilateral force assessment and require time to process and analyze the data. Only a few facilities in the world have enough in-ground force plates in a row to make assessment possible but the cost of a sufficient number of in-ground force plates is in the magnitude of millions.

The isometric mid-thigh pull is widely used as a total body strength assessment. The traditional method has been to use expensive force plates in a lab based environment. The force plates are usually immovable (fixed in floors) or are very large and heavy to move around.

Further, traditional equipment used in measuring the forces exerted during isometric exercises have several drawbacks. For example, data is measured at low sample rates, limiting the ability to capture force curves with precision. During isometric exercises, force curves can include sharp impulses that can contain information that may be useful in analyzing an athlete's performance. However, because of the limited sampling rate of measuring equipment, impulse force curves are typically only captured and analyzed using a small number of data points. Various analyses of the impulse force curve are thus inaccurate and difficult to perform. For example, without a sufficiently high sample rate, it is difficult to detect precisely when an impulse force curve begins, what its rate of change is during the very beginning of the impulse, and when the impulse curve has reached its peak.

High sample rates are particularly challenging to incorporate into systems with portable or wearable exercise measurement sensors because of the additional computational overhead that the high sample rates cause. For example, transmitting data obtained from high sample rates results in sending data packets that are large in size which are inefficient because they consume additional memory. The larger packet size takes up bandwidth and memory space, and can slow the rate of data transmission to a receiver.

Accordingly, what is needed is a force sensing system that is optimized to obtain and report with accuracy and in a manner suitable to a user, data of impulse force curves while minimizing overhead.

The present invention may provide an improved unilateral sled and force measurement device or at least provide the public or industry with a useful choice.

SUMMARY

According to one example embodiment there is provided a system for measuring physical exertion comprising a strain gauge and a central processing device. The strain gauge can have a power source, an inertial measurement unit ("IMU"), a microcontroller and a wireless communication module. The IMU can include a load cell having a resistive circuit supported by a conductive material such that the resistive circuit varies its resistance in proportion to an amount of force applied to the conductive material. The load cell can be configured to output strain data at a rate of at least 1 kHz.

The microcontroller can include a processor and a memory for storing instructions and strain data received from the IMU. The microcontroller can be coupled to the power source and the processor can be configured to execute the instructions stored in the memory. The wireless communication module can be coupled to the microcontroller and configured to transmit strain data stored in the memory in real-time. The central processing device can be configured to receive strain data transmitted from the wireless communication module. The central processing device can be configured to convert the strain data into force measurements, store the force measurements into a force event array, detect a force event based on the force measurements of the force event array, determine the length of the force event, determine the max force based on the length of the force event, and determine a rate of force development ("RFD") based on the max force.

In some embodiments, the strain gauge can be enclosed in a case having a first and second eyebolts. The system can further include a handle, a first chain coupled to the handle and the first eyebolt, and a second chain coupled to the second eyebolt and a surface-mounted hook. The strain gauge can be configured to measure strain data resulting from strain when a user pulls the handle.

Preferably, the load cell is an s-bridge load cell.

Preferably, the force event is detected by determining whether a force measurement of the force event array is lower than a first threshold and greater than a second threshold.

Preferably, the wireless communication module can transmit strain data in one or more data packets. Each of the one or more data packets can include 200 bytes of sampled strain data and 6 bytes of overhead. The 6 bytes of overhead can include a header, a footer, a checksum and a flag.

Preferably, the inertial measurement unit is a first inertial measurement unit, and the measurement system further includes a second inertial measurement unit.

Preferably, the second inertial measurement unit is configured to determine the orientation and direction of the strain gauge.

Preferably, the central processing device is further configured to plot the force measurements of the force event array as a force event curve on a user interface.

Preferably, the measurement system further includes a feedback mechanism.

Preferably, the feedback mechanism provides haptic feedback, auditory feedback, or visual feedback.

Preferably, the feedback mechanism is configured to alert a user when a goal is achieved.

Preferably, the feedback mechanism is configured to alert a user to correct an error.

In some embodiments, the measurement system includes a handle and a spool that houses a wire. The wire can be coupled to the handle, and the spool can be configured to retract the wire when tension is released from the wire. The strain gauge can be configured to measure strain data resulting from strain when a user pulls the handle.

In some embodiments, the handle further includes cups for compression exercises.

Preferably, the strain gauge is calibrated according to a calibration file.

Preferably, the measurement system further includes a database for storing the force measurements of the force event array as a force event curve with a date and time stamp.

Preferably, the central processing device is configured to retrieve the force event curve of a user for comparison to the force event curve of another user.

In some embodiments, the force measurements of the force event array can be used to generate an exercise regime.

Preferably, the measurement system further includes an accelerometer and magnetometer to determine the real world position of the strain gauge.

In some embodiments, the measurement system identifies a user with biometric information.

In some embodiments, the measurement system further includes a digital immersion device. The digital immersion device can render a three-dimensional display used to gamify one or more activities based on the strain gauge's motion. The digital immersion device can be a virtual reality system, an augmented reality system, or a mixed reality system. The measurement system can further include a feedback mechanism that provides haptic feedback based on the gamified one or more activities.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 6 is a flow diagram of the data processing of the force sensing system data;

FIG. 7 is a flow diagram of the data processing of the additional module data;

FIG. 14 is a flow diagram of the central processing device processing force events according to some embodiments.

DETAILED DESCRIPTION

Figure 1:
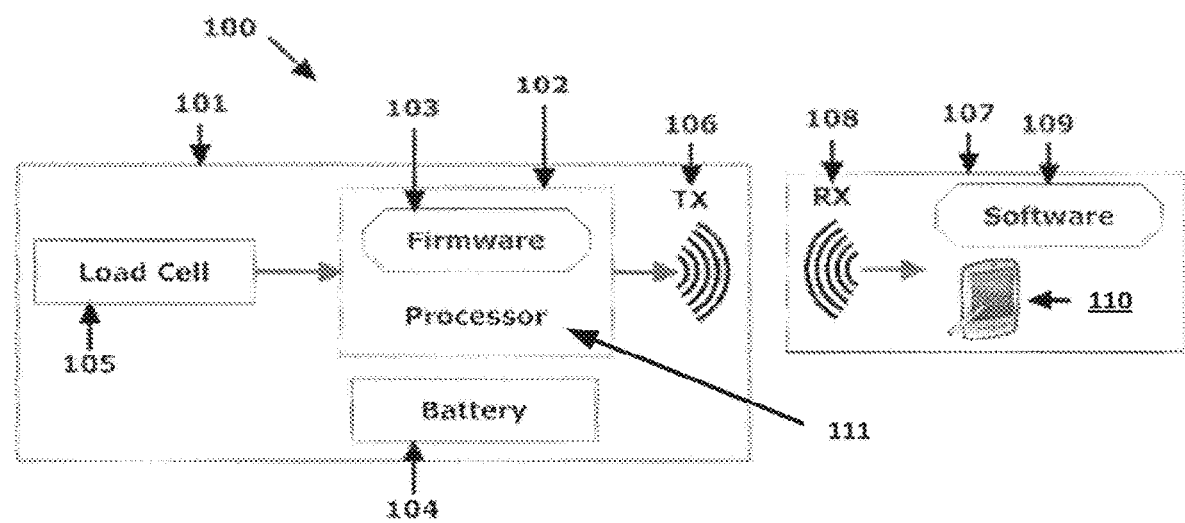
FIG. 1 is a schematic diagram of a force sensor unit.

FIG. 1 illustrates a force sensing system 100 according to an example embodiment. The force sensing system/platform is comprised of a strain gauge 101 that is wirelessly 106, 108 interfaced to a receiver 107. The receiver 107 may be a specialized computing device running the custom firmware 109 or may be an application 109 suitable for running on a smartphone or other electronic computing device 110.

The strain gauge 101 is typically enclosed in a case, and includes a circuit board, a power source such as a battery 104, a microcontroller 102, including a processor 111 and memory in communication with the processor. The memory storing software/firmware 103 executable by the processor, the strain gauge 100 further includes a communication device/module in one embodiment a wireless communication module 106 and an inertial measurement unit, typically a load cell 105. The case of the strain gauge 101 has two connection points, in one embodiment eyebolts, can be used with hooks or carabineers.

In some embodiments, the load cell can be an s-bridge load cell capable of sampling data at a sampling rate of 1 kHz. An s-bridge load cell can be a resistive circuit that is supported by a conductive material, such as a metal, that is in the shape of an "S." The resistive circuit of the s-bridge load cell can vary its resistance in proportion to the amount of force applied to the conductive material based on how the shape of the material is deformed due to the force being applied to the conductive material. The change in resistance can correlate to a change in pressure that reflects the amount of strain applied to the material. In this way, the strain gauge outputs strain data by measuring the deformation in the shape of the material supporting the resistive circuit. In yet further embodiments, the load cell can be a cylindrical strain gauge. The microcontroller processor can be configured to continuously measure the deformation in the shape of the material and receive the samples recorded by the load cell.

Figure 3:
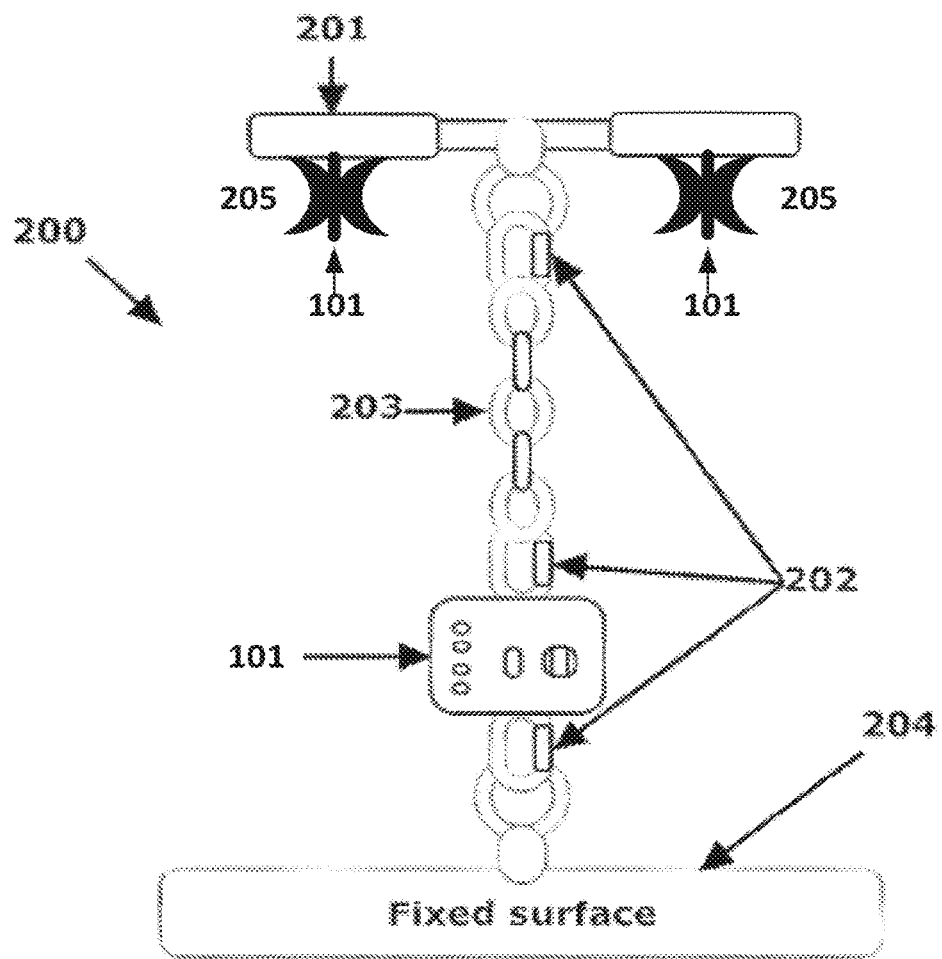
FIG. 3 is a side view of the of an embodiment of the sled.

Referring to FIG. 3 a wireless force sensing device 200 incorporating the strain gauge 101 is illustrated. The wireless force sensing device 200 allows a user to perform an isometric mid-thigh pull in any environment that has a connection to a surface, such as a floor, wall, or ceiling (most gyms have squat racks or lifting platforms with hooks in the floor, wall, or ceiling). For example, the strain gauge can be coupled to a hook mounted onto the floor for leg exercise and the wall or ceiling for other upper body exercise. Alternatively, a steel or other suitable plate may be used. The device is portable and wirelessly streams data in real-time to a central processing device, which can be a smartphone or PC app 107. The smartphone of PC app can be substituted with a laptop, handheld PC, tablet, or similar portable computing device.

The wireless force sensing device 200 includes a handle 201, chain 203 or other non-elastic connector, connecting the handle to the strain gauge 100, typically with hooks or carabineers 202. Chain 203, or other non-elastic connector, further connects the opposite side of the strain gauge 100 is fixed to a surface or plate 204. The carabineer 202 can be magnetic so that they can easily attach to a rack or wall. When a user pulls on the handle to perform an isometric mid-thigh pull, the wireless force sensing device 200 can measure the strain applied to the strain gauge.

In some embodiments, chain 203 can be substituted with a wire and a spool. The wire can be adjustable to work with users of different height and to accommodate different exercises. The wire can be constructed of material with elasticity to absorb tension applied between the user and the spool. When a user releases the handle bar, the spool will retract the wire to reduce slack in the wire. When a user pulls the handle bars, the wireless force sensing device 200 can measure the strain applied to the wire in the spool. The wire and spool can be enclosed in the wireless force sensing device itself. In some embodiments, the movement of the spool can also be measured to determine strain. For example an encoder can be used to determine the rate and acceleration of the spool rotation, and how much wire has been pulled out of the spool. This can, in turn, be used to determine and analyze a force event curve as described in more detail below.

In some embodiments, the bars 201 can include cups 205 at each distal end. The cups 205 can include strain gauges 101 that measure compression forces in the same manner as the extension forces described above. A user can use the cups in leg exercises that would involve compression, such as a hip abduction. In hip abduction exercises, a user could place each knee on the inside or outside of a cup and push inwards or outwards. In this way, a wireless force sensing device 200 can incorporate strain gauges 101 to provide strength training using both compression and extension forces.

Figure 9:
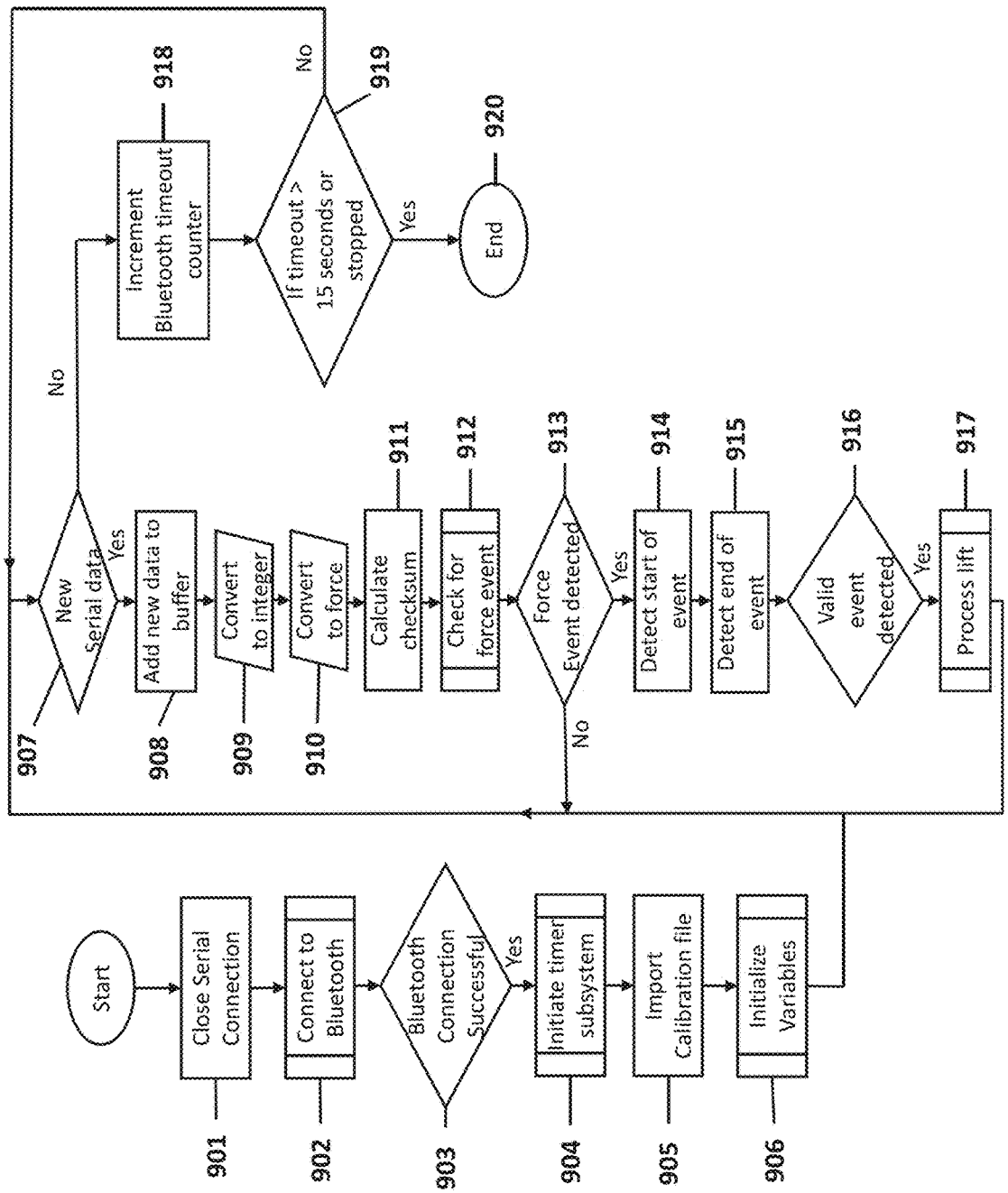
FIG. 9 is a flow diagram of the data processing of the wireless force sensing device and central processing device according to embodiments of the invention.

In some embodiments, the wireless force sensing device 200 can wirelessly stream data in real-time to smartphone or PC app 107 according to the methods and steps shown in FIG. 9. For example, the wireless force sensing device can begin in step 901 by closing currently open connections to allow for new connections to be established. The connections can be a wireless connection from a smartphone or PC app 107 to a receiver 107 on the strain gauge, and the connection can be for example, a Bluetooth connection. Once the connections have been closed, new connections can be established in 902. For example, the smartphone or PC app may display a user interface that presents devices that are available for connection via Bluetooth. When a user selects a device from the interface, the smartphone or PC app will attempt to establish a connection to the wireless force sensing device 200 and notify the user whether the connection was successful or not in step 903. If the connection is successful, the smartphone or PC app initiates a timer subsystem as shown in step 904, imports a calibration file 905, and initializes variables 906.

Calibration files can be used to correct force measuring errors that may be introduced into the devices during assembly. During the construction of the wireless force sensing device 200, the enclosure may be fastened in such a manner that the baseline measuring capability of the strain gauge is offset. A calibration file can be created for the wireless force sensing device 200 to account for the offset. For example, a calibration file can include a formula, look-up table, or similar scaling function that translates a value received from a sensor to a measurement value that corrects any offset to provide an accurate reading.

In step 907, the smartphone or PC app checks for new data sent from the wireless force sensing device 200. If data has been received, the smartphone or PC app begins adding new data to a buffer, as shown in step 908. The data is then converted to an integer 909, which is then converted into a measurement of force 910. In step 911, the smartphone or PC app calculates a checksum to verify the integrity of the data transmission.

In step 912, the smartphone or PC app attempts to detect a force event. If the smartphone or PC app determines that no force event has been detected, then the smartphone or PC app returns to step 907 and continues receiving data to its buffer from the wireless force sensing device 200. If the smartphone or PC app determines that a force event has occurred, it proceeds to step 914 to determine the beginning of the start event and step 915 to determine the end of the start event. In step 916 the smartphone or PC app determines if a valid event has been detected. If so, then in step 917 the process returns to step 907 to continue listening for new data. If not, the smartphone or PC app logs the invalid event and then returns to step 907.

In step 907, if data has not been received, the smartphone or PC app increments a timeout counter in step 918 and returns to step 907. The timeout counter is continuously incremented until a threshold is reached, as shown in step 919. If for example, the timeout counter reaches 15, which can, for example, represent 15 seconds without receiving data, the smartphone or PC app can end the connection to the wireless measuring device in step 920.

Figure 10:
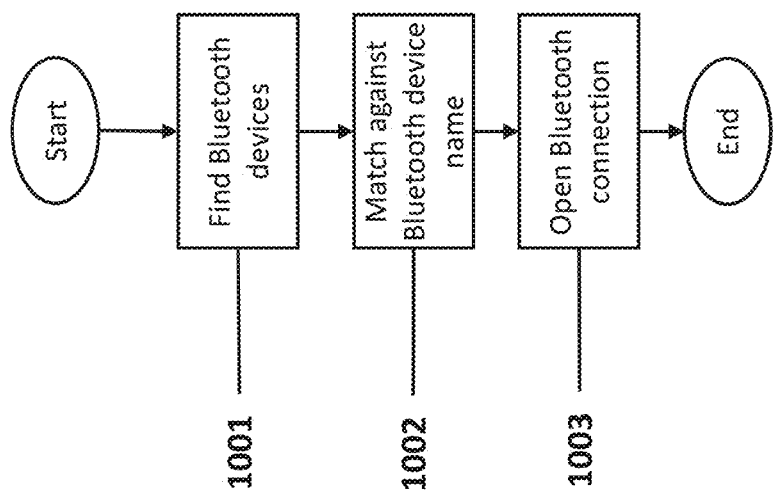
FIG. 10 is a flow diagram of the central processing device establishing a wireless connection to the wireless force sensing device according to some embodiments.

In some embodiments, the smartphone or PC app establishes a wireless connection to the wireless force sensing device 200 according to the methods shown in FIG. 10. For example, the smartphone or PC app can initiate a search in step 1002 for a wireless force sensing device 200. The smartphone or PC app sends a broadcast signal for all wireless force sensing devices 200 that can establish a wireless connection and that are available for communicating to the smartphone or PC app.

The smartphone or PC app receives a response signal from any wireless force sensing device 200 that is available to connect. The response signal can include an identifier, such as for example, the name of the device. In some embodiments, the identifier can be an alphanumeric code assigned to the device manually or automatically. The identifier can be a unique identifier, so that each wireless force sensing device 200 can be uniquely distinguished over another. In step 1002, the smartphone or PC app then determines if the identifier of the wireless force sensing device 200 matches the name of the wireless force sensing device 200 selected by the user, as described above in step 902.

Figure 11:
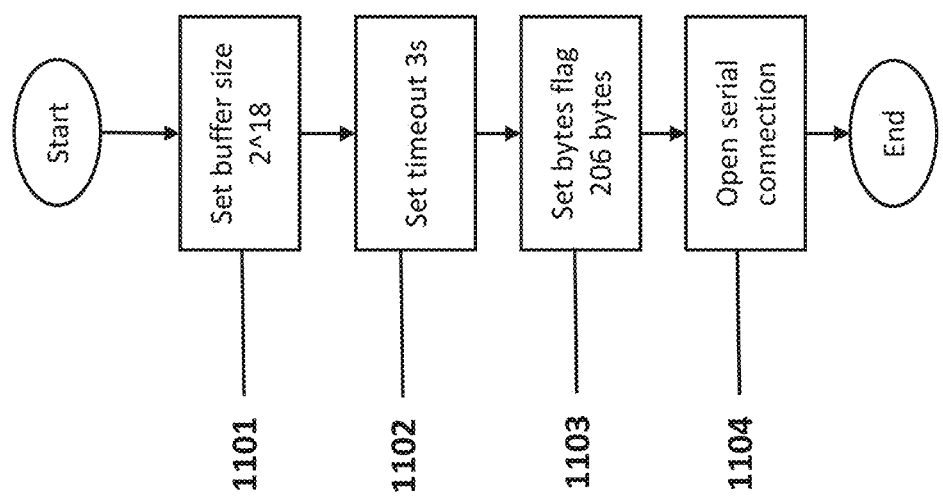
FIG. 11 is a flow diagram of the central processing device initiating a timer subsystem according to some embodiments.

In some embodiments, the timer subsystem is initiated according to the methods shown in FIG. 11. For example, the smartphone or PC app sets a buffer size in step 1101. In step 1102, a timeout can be set to a predetermined threshold, such as for example, 3 seconds.

In step 1103, a bytes flag is set. A bytes flag is used to indicate the end of a packet of data sent from the wireless force sensing device 200. As described above, high sample rates can lead to additional overhead that burdens the transmission and processing system. An optimal sample rate that achieves high throughput efficiency can be found by tailoring the amount of samples in the transmitted data packet and eliminating unnecessary field codes. For example, in some embodiments, an optimal data packet size is 206 bytes and an optimal sampling rate is 1000 samples per second (1 kHz). Of the 206 bytes of data, 200 bytes can be used to store 100 samples of signal data every ¹/₁₀ of a second. Thus, every 0.1 seconds, 200 bytes of data are received in a data packet. The remaining 6 bytes in the packet are used to store packet header, footer, checksum and flag information. The flag byte is used to clearly demarcate the end of a data packet. A data packet size of 206 bytes and sampling rate of 1 kHz has been found to provide sufficient resolution in the force event curve with minimal overhead. In step 1104, the smartphone or PC app readies the buffer for receipt of data from the wireless force sensing device 200.

Figure 12:
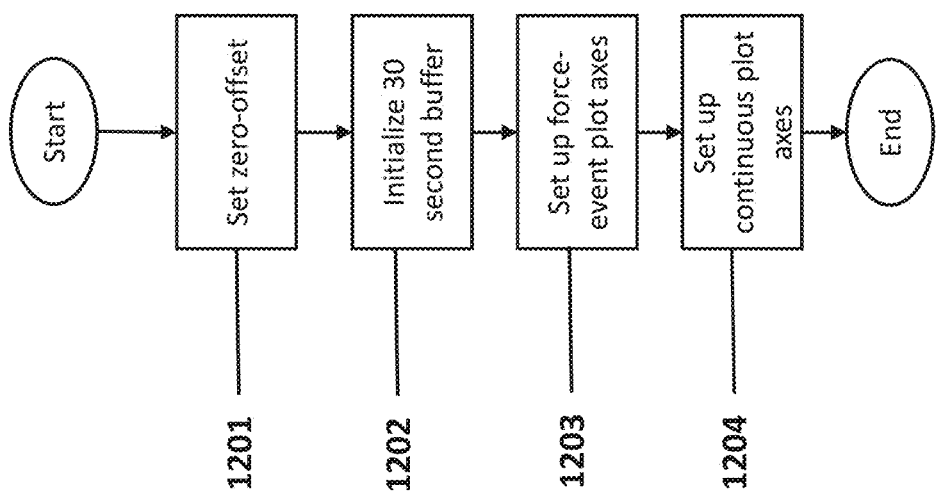
FIG. 12 is a flow diagram of the central processing device initializing variables according to some embodiments.

In some embodiments, the variables are initialized according to the methods shown in FIG. 12. For example, the smartphone or PC app can set a zero-offset of the relevant variables in step 1201, allocate a buffer for receiving data in step 1202, setup force-event plot axes in step 1203 and setup continuous plot axes in step 1204.

Figure 13:
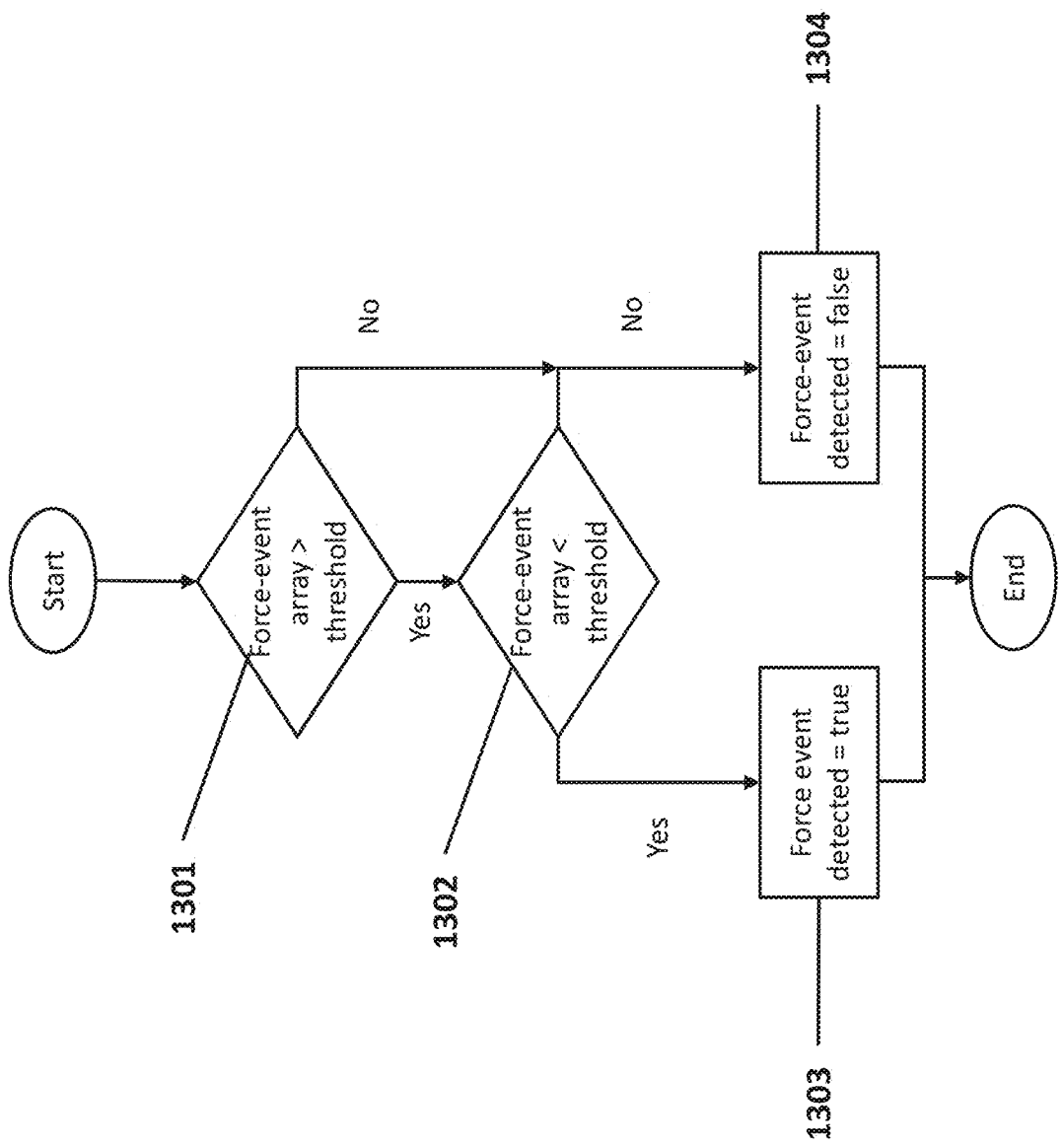
FIG. 13 is a flow diagram of the central processing device checking for force events according to some embodiments.

As described above, the smartphone or PC app checks for force events in step 912. In some embodiments, the smartphone or PC app can check for force events according to the methods shown in FIG. 13. For example, the smartphone or PC app can store the converted force measurements into a force event array, and then scan the array to determine if the force measurements exceed a first threshold, as shown in step 1301. If so, then the smartphone or PC app proceeds to step 1302 where it determines if the values are below a second threshold. If a force measurement falls between the first and second thresholds, then the smartphone or PC app determines that a force event has been detected as shown in step 1303. If the force measurement is either lower than the first threshold or greater than the second threshold, then the smartphone or PC app determines that a force event has not been detected as shown in step 1304.

In some embodiments, the smartphone or PC app processes force events according to the methods shown in FIG. 14. As described above, the force measurements can be stored in an array. The smartphone or PC app attempts to determine the length of the force event by searching for the end of the force event in the array as shown in step 1401, and the start of the force event in the array as shown in step 1402. The smartphone or PC app can determine a force event length by subtracting the difference between the force event start and force event end measured in steps 1401 and 1402. In step 1403, the smartphone or PC app determines if the force event length falls in between the first and second thresholds, as described in more detail above. For example, if the force event length is greater than 50 milliseconds and less than 30 seconds, the smartphone or PC app determines that a force event has occurred. The smartphone or PC app then increments a variable keeping track of the number of force events that have occurred in step 1404. The smartphone or PC app then plots the force event as shown in step 1405. The force measurements of the force event array can be plot as a force event curve on a user interface showing the change in force as a function of time. In step 1406, the limits of the plot can be updated based on the length of the force event measured. In step 1407, the force event can be associated with a date and time stamp and stored in a database for future retrieval and analysis.

Several signal filtering and smooth techniques can be performed to further analyze the force event curve data. In some embodiments, the force event curve data can be filtered, for example, by applying a Butterworth filter as shown in step 1408. The Butterworth filter can be a 4th order low pass Butterworth filter with a cutoff frequency of 50 Hz. The filtering helps remove errors that may have been introduced in the data during transmission. In other embodiments, a sliding average can be applied to the data to smooth out fluctuations in the data points.

In step 1409, a max (i.e., peak) force can be detected. Using the force event start and force event end, the smartphone or PC app scans every measurement in the force measurement array to determine the max force measurement value. In step 1410, the smartphone or PC app approximates a rate of force development ("RFD"). In some embodiments, the RFD can be approximated by calculating the slope of the force event curve from a point of rest (i.e., no force, or zero force) to the point of max force. The force event curve from the point of rest to the point of peak force is typically characterized by an impulse waveform because of the nature of the exercises used with the strain gauge device. For example, the mid-thigh pull is typically characterized by an explosive burst of force in the beginning resulting in a sharp increase in force resembling an impulse waveform.

Because the wireless force sensing device 200 measures data at a high sampling rate and wirelessly transmits the data with minimum overhead, the smartphone or PC app can analyze the force event curve and perform the above steps with a high degree of accuracy and precision. For example, the higher sampling rate provides a higher resolution of data in the array of force measurement, which enables the smartphone or PC app to more accurately determine the RFD or precisely determine when the impulse of the force event curve begins. If the resolution of the data is too low, the impulse waveform may be distorted or the smartphone or PC app may be unable to accurately detect the beginning of the impulse of the force event curve.

The accuracy of determining when the onset point of when the force event curve begins can vary widely across different force-time events. It can also vary based on whether there is movement artifact, whether the participant's posture is incorrect, or whether there are pretension forces and noise artifacts distorting the signals. Because the force event curve can be highly influenced by how the start of a force event is identified, the accuracy of time specific variables, such as the RFD, and the impulse of the signal are also impacted by the type of force-time event.

The methods described herein offer several advantages over other techniques. For example, one technique for determining the onset of force is to pick an arbitrary threshold value, such as for example, 20N, 40N, 75N, or a relative measure of body weight (e.g., X % BW), and define the onset based on when the measured value exceeds the threshold. As another example, the onset of the force event curve can be determined based on the curve's instantaneous rate of change of force with respect to time. Specifically, an onset can be defined as a shift of some number of standard deviations in the instantaneous rate of change, such as for example, 2 to 5 standard deviations. In a further example, the onset force curve can be determined manually, with a user determining the onset of the force event curve by visually inspecting the curve on a display and manually selecting the point of onset. In yet another example, the onset of the force event curve can be determined using machine learning techniques. However, machine learning techniques can be computationally intensive and can significantly add to the processing overhead of the system.

The foregoing techniques use a "forward" approach; the detection of the force event curve onset is determined as the force rises with time. By contrast, the force onset detection techniques described herein determine peak force and then move "backwards" (i.e., reverse, or against time), tracing along the force event curve in order to detect the on-set of force. The "backwards" tracing of the force event curve improves the accuracy in the detection of the force event curve onset across a wide range of activities.

In some embodiments, the smartphone or PC app can display a window showing the force event impulse plot along with tools to enable a user to determine the start, end, and peak of the force event curve. For example, the window may allow a user to zoom into regions of the plot and select data points along their curve to identify their values. The values may then be processed by the smartphone or PC app to determine the RFD of the force event curve. Allowing a user to assist with determination of these values is helpful when, for example, the received data is noisy or irregular.

The force measurements and calculations can be stored in a database for future retrieval and analysis. For example, the force measurements and calculations can be associated with a user, date and time stamped, and then stored in a database such as a local database, or a remote database located in the cloud. When the user returns on another date and time to use the strain gauge and force measuring device, the user's performance can be compared to the previous force measurements and calculations. In this way, a user's overall performance can be assessed over time to determine improvement and benchmark progress. A user can thus identify when he or she has achieved a personal best for a particular metric, such as for example, max force or RFD. A user can then compare subsequent uses to his or her personal best.

In some embodiments, the remote storage can store the recorded performance of other users that can be used for further comparison and analysis. For example, a user can view the difference between his or her peak force or RFD and the peak force or RFD of a professional athlete. The user can thus determine how close his or her performance level is to a particular professional athlete. As another example, if the wireless force sensing device 200 is being used to help the user rehabilitate from an injury, the user's performance can be used to compare to other people who have sustained similar injuries to mark the user's progress. Thus, a user on week 10 of rehabilitation from a broken leg can compare his or her progress to the previously recorded performance of someone else who sustained the same injury and used the wireless force sensing device 200 on week 10. A user can also perform exercises prior to a surgery to establish a baseline, and then use the baseline to compare to his or her post-surgery exercises.

In some embodiments, the repetition of exercises over time can be used to ensure accurate monitoring and measuring of change in a user's force event curve. For example, a user can be instructed to perform a set of exercises, tasks, or motions on a given day while being measured. The user can then be instructed to repeat those very same exercises, tasks, or motions on the very same strain gauge device under the very same settings on the following week for the subsequent ten weeks. The force event curve from the second week can be compared to the first week, the force event curve from the third week can be compared to the second week, and so on, for all ten weeks. The change in the force event curve over the ten weeks can be monitored and used to accurately chart a user's improvement. Because the exercises, tasks, or motions were repeated under the same exact circumstances over the ten weeks, the overall change in the force event curve can be determined independent of any calibration or offset, or without the need to determine an absolute force value.

While references are made to using the systems, methods, and apparatuses described herein to determine an athlete's performance, it will be understood that the systems, methods, and apparatuses described herein can also be used to analyze motion and exertion in industries such as for example, rehabilitation, therapy, or geriatric treatment.

Similarly, a user's measured performance on one given exercise can be used to develop a training regime involving various other exercises. For example, if a user reaches a certain threshold of max force during an exercise, the smartphone or PC app can recommend a particular starting weight for when the user performs a deadlift. For example, if a user reaches 200 Newtons during a mid-thigh pull, the smartphone or PC app can recommend the user begin with a 100 kg deadlift, 50 kg squat, 75 kg block pulls, and 80 kg hamstring curls. The starting weight can be determined using machine learning or artificial intelligence algorithms that identify correlations and patterns between mid-thigh pull outputs and deadlift baselines. Estimating training regimens can be particularly helpful with users in physical therapy because a detailed exercise regimen can be generated without having to subject the user to a high risk activity.

In some embodiments, the user can be identified by name, username, biometric, alphanumeric code, or a similar identifier. A biometric identifier can be, for example, the user's fingerprint or palm, which can be scanned on the handle bar to identify the user. As another example, the user may approach the wireless force sensing device 200 and use his or her smartphone to scan a code on the wireless force sensing device 200 such as a QR code. As yet another example, the user can have a near-field communication device such as a badge that is automatically recognized when the user approaches the wireless force sensing device 200. When the user is registered with the wireless force measuring device, the wireless force sensing device 200 can then sync with the smartphone or PC app to receive data.

Figure 2:
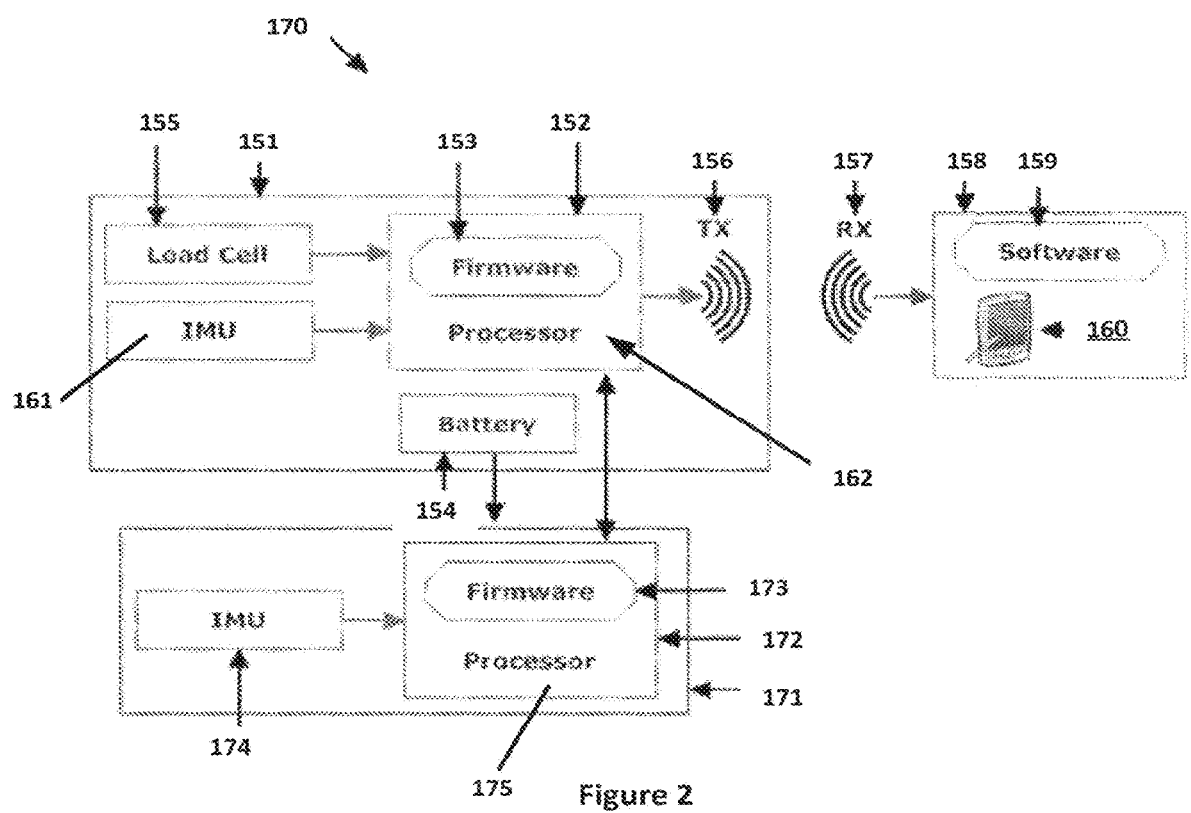
FIG. 2 is a plan view of an embodiment of a sled.

In a further embodiment illustrated in FIG. 2 the measurement system 170 includes an inertial measurement unit/ IMU 161. The force sensing system/platform is comprised of a force sensing device 151 that is wirelessly interfaced 156, 157 to a receiver 158. The receiver 158 may be a specialized computing device running custom firmware 159 or may be an application 159 suitable for running on a smartphone or other electronic computing device 160.

The force sensing device 151 is typically enclosed in a case, and includes a circuit board, a power source such as a battery 154, a microcontroller, including a processor 152 and memory in communication with the processor. The power source, processor and memory may be located in a separate case. The memory storing software/firmware 153 executable by the processor, the force sensing device 151 further includes a communication module in one embodiment a wireless communication device/module 156, a one direction (1D) load cell 155 and an inertial measurement unit 161. The inertial measurement unit 161 includes a magnetometer, a gyroscope and at least one accelerometer.

The measurement system can communicate with further expansion modules including second sensing device 171 such as an additional inertial measurement unit 174 also illustrated in FIG. 2. The expansion module 171 includes an inertial measurement unit 174, a microcontroller 172, including a processor 175 and memory in communication with the processor. The expansion module 171 is controlled by firmware 173 and is typically wired to the force sensing device 151. Multiple expansion modules may be used. The inertial measurement unit 174 includes a magnetometer, a gyroscope and at least one accelerometer.

In some embodiments, the additional inertial measurement unit 174 can be used to assist with determining the orientation and direction of the strain gauge device during an isometric exercise such as a mid-thigh pull. For example, the additional inertial measurement unit 174 can be affixed to the handle bar and used to determine the direction of the user's pull. In this way, the smartphone or PC app can identify if the user is leaning forward or backward during a pull. If a user is leaning backward, for example, the smartphone or PC app can send an alert that the user is pulling the strain gauge device improperly and instruct the user to correct his or her position. Because leaning forwards or backwards distorts the force readings on the strain gauge, alerting a user when he or she is pulling at a direction off from center will allow the strain gauge to collect more accurate data.

Similarly, an accelerometer and magnetometer can be used to determine the real world position of the strain gauge device. The accelerometer, magnetometer, and gyroscope can also be used to identify other dynamics that are helpful in identifying relevant force events. For example, if the user is performing isometric exercises that are relatively stationary, but the gyroscope has detected a large amount of three dimensional movement during an exercise, the smartphone or PC app can identify an inconsistency recognize the force event as a false positive.

In some embodiments, more than one force measuring device 200 can be used in an exercise apparatus and coupled to a smartphone or PC app over a wireless connection. For example, the exercise apparatus may be a mid-thigh pull device as shown in FIG. 3, but with two chains 203 and strain gauges 101—one on each end of the handle bar. In this way, the two strain gauges can be used to determine the individual force of a user's left or right foot to see if there is a difference in strength between the user's left or right side. In some embodiments, the wireless force sensing device 200 can be a bench press bar or a deadlift bar with a strain gauge at each end of the bar to determine any difference between the strength of the user's left and right side. A Bluetooth version 5 connection can be used to allow for multiple simultaneous connections at once. Thus, both the left and right strain gauges can communicate to the smartphone or PC app at the same time.

In some embodiments, the wireless force sensing device 200 can include one or more feedback mechanisms. The feedback mechanisms can provide haptic feedback, auditory feedback, visual feedback and other similar forms of sensory perception. Haptic feedback can include tactile stimulation to the handle bar 201. For example, the handle bar may vibrate or pulse in a certain manner if a user has achieved a goal, or if the user is holding the handle bar incorrectly. A user may be holding the bar incorrectly by, for example, leaning or arching their back during a mid-thigh pull in attempt to "cheat" during the exercise because such leaning may make it feel easier to pull the strain gauge. Auditory feedback can include music, ringtones, verbal messages, and other sounds emitted from the strain gauge 101, handle bar 201, or both. The type and volume of sound the wireless force sensing device 200 plays can depend on the type of feedback desired. For example, a celebratory sound can play if a user has achieved a goal, or a loud warning tone can play if the user is holding the handle bar incorrectly. Visual feedback can include lights emitted from LEDs or similar optical devices in the strain gauge 101, handle bar 201, or both. The amount and color of light emitted from the optical device can depend on the feedback desired. For example, the strain gauge can include a series of LEDs that range in color from green, to yellow, to red. When low amounts of force are applied, the green LEDs light up, and as the amount of force increases, the yellow and red LEDs light up. A combination of feedback mechanisms can be used to effectuate the desired feedback. For example, haptic, auditory, and visual feedback may all be used together at once.

The feedback mechanism can be triggered based on various measurements provided by the wireless force sensing device. For example, the feedback mechanism can be used to indicate that a target max force measured by the strain gauge has been achieved. It can also be used to indicate whether something is wrong. For example, the feedback mechanism can indicate that a user is holding the handle bar incorrectly or with the wrong orientation.

In some embodiments, the wireless force sensing device 200 can include one or more digital immersion devices for rendering three-dimensional displays. A digital immersion device can be, for example, a virtual reality system, that provides a complete immersion experience by generating an artificial, computer-generated simulation or recreation of a real life environment or situation. The objects that reside in the virtual environment can be further simulated by computer-generated sensory feedback, such as visual, auditory, haptic, somatosensory and olfactory feedback. A virtual reality system can be, for example, the Oculus Rift®, Oculus Quest®, Playstation VR®, or HTC VIVE®. Such virtual reality systems can include a headset with LCD or OLED panels and lenses that fill a user's field of vision with a visual.

A digital immersion device can also be an augmented reality system. An augmented reality system layers computer-generated enhancements on top of an existing real-world environment while allowing the user to interact with the real-world environment. The additional layers can be interwoven with the physical world such that one aspect of the real-world environment is partially immersive to the user. An augmented reality system can include headsets and other devices that add virtual components such as digital images, graphics, or other sensations as a new layer of interaction with the real-world environment. The objects that reside in the real-world environment can be augmented by computer-generated sensory feedback, such as visual, auditory, haptic, somatosensory and olfactory feedback. An augmented reality system can be, for example, the Microsoft Hololens®, the Magic Leap Lightwear®, or Google Glass®.

A digital immersion device can also be a mixed reality system that combines elements of virtual reality systems and augmented reality systems to produce new environments and visualizations that allow physical and digital objects to co-exist and interact in real time.

The three-dimensional displays generated by the digital immersion devices can be used to gamify one or more activities based on the strain gauge's motion. Thus, activities such as a mid-thigh pull, can be transformed into an entertaining and stimulating experience that motivates the user to complete the activities.

For example, the digital immersion device can render a scene with a sword implanted in a stone, where the strain gauge device can be simulated to look and feel like the sword. As a user lifts the strain gauge device, the digital immersion device can create the simulated effect of the user removing the sword from the stone. The activity can be gamified such that the sword is not released from the stone until the user lifts a predetermined amount of weight (e.g., 200 lbs) or exceeds a predetermined amount of force (e.g., 40 N). In this way, the gamification of the activity can provide entertainment and motivation to the user to achieve higher performance. As another example, the digital immersion device can render a scene with a floor door or hatch, and the motion of the strain gauge during a mid-thigh pull can be used to simulate a user opening the floor door or hatch.

Figure 4:
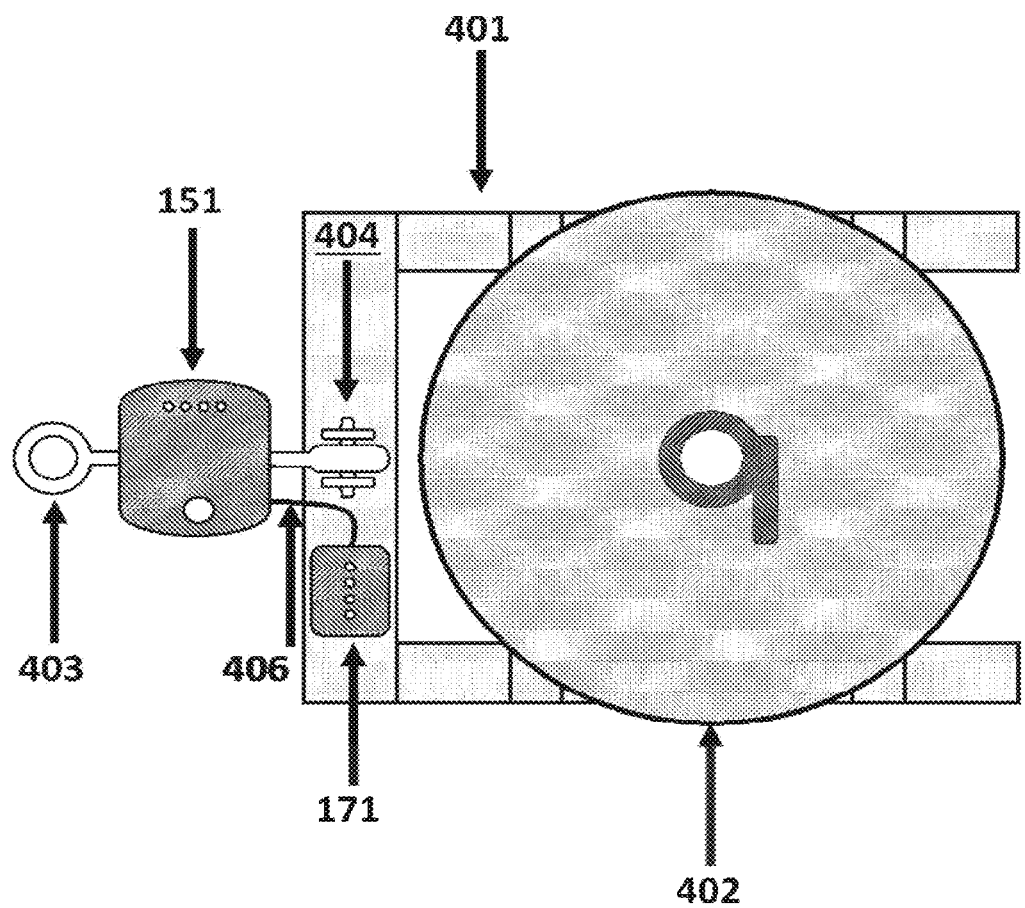
FIG. 4 is an image of an alternative embodiment of the sled.
Figure 5:
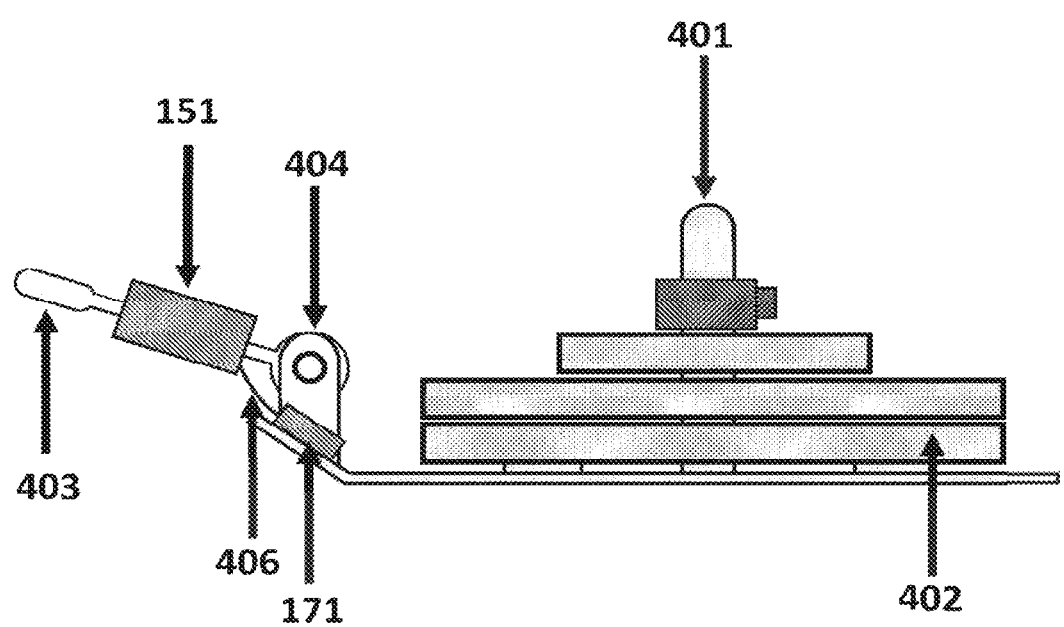
FIG. 5 is a view of a harness used for pulling a sled.

Referring to FIGS. 4 and 5 there is depicted a wireless force sensing device 151 mounted on a weighted resistance towing sled 401 with an inertial measurement unit expansion board 171. The resistance towing sled 401 may be fitted with a plurality of weights 402. The purpose of this system is to measure the single leg vertical and horizontal components of force produced by a user whilst a user is performing a resisted sprint using a weighted sled. The user will wear a harness, which will be attached to a non-elastic tether. The tether will be attached 403 to wireless force sensing device 151 via an attachment member by for example an eyebolt, which will be mounted on the sled 401 via a rotating hinge joint 404. The wireless force sensing device 151 will be wired (preferably discreetly} 406 to an addition inertial measurement unit expansion module 171. Optionally the wireless force sensing device 151 and the expansion module 171 will be covered by a waterproof shell. Optionally the wireless force sensing device 151 will be wirelessly connected to an addition inertial measurement unit expansion module 171.

The inertial measurement unit on the wireless force sensing device 171 will output the angle of pull by measuring the angle of the device relative to the ground. The angle and force will be used to calculate the horizontal and vertical force vectors experienced on the sled 401 during a resisted sprint. The inertial measurement unit on the expansion board 171 will measure the linear over-ground acceleration of the sled.

A software program wirelessly acquires the data from the device 170 and displays the data on a PC or smartphone (or another device as discussed above) remotely. The wireless force sensing system in combination with the software will allow for assessment of unilateral (i.e. single-leg) horizontal force production during over-ground resisted sprinting. Variables available will include single leg horizontal force, power, velocity and acceleration. These variables can be measured during maximal sprint exercise, submaximal running, or other movements (e.g. striding, fireman's pull).

The sled is a tool for the training, testing and monitoring of maximal sprinting performance during all sprint phases, including but not limited to initial acceleration (first few steps), acceleration, maximum velocity and deceleration. The outputs from the device will enable the user to make empirical judgements surrounding the current performance level of the athlete, potential risk of sports injury, and directly implement training protocols using the device itself.

Referring to FIG. 4 an alternative embodiment is illustrated a user 100 will wear a harness 101, which will be attached to two non-elastic tethers 102. Each tether 102 will be attached to a force sensing device 151 via an attachment member by for example an eyebolt, which will be mounted on the sled 401.

Referring to FIG. 5 an alternative embodiment is illustrated a user 100 will wear a harness 101, which will be attached to a force sensing device 151 that may or may not include an IMU. The force sensing device 151 will in turn be attached to a tether 102. An IMU 106 may be used to calculates the linear distance, velocity and acceleration variables can be located on the harness 100 and house the battery and the transmitter that transmits the data to a receiver. Multiple force sensing devices 151 may be used and two or more tethers may be used to connect to the sled.

Referring to FIGS. 6 and 7 the software then processes the data collected from the sled sensors including strain gauge 610, magnetometers 620, 720, gyroscopes 630, 730 and accelerometers 640, 740 using at least the following steps:

Referring to FIG. 6 the software receives the strain gauge data 610, filters 611 the data to remove noise and produce a force measurement 612.

From the magnetometers 620, gyroscope 630 and accelerometers 640 the system receives data and applies a filter 621, in one embodiment a Kalman filter, the software then calculates the angle of pull 622. Based 613 on the force 612 and the angle of pull 622 the system calculates horizontal force 614 and vertical force 615.

Using a peak detection algorithm each step is detected as left or right 616 and the maximum force at each step is calculated and the system displays the average force for left 617 and right 619 steps and the ratio 618 between left and right.

From the additional module 171 the system calculates linear velocity 714, linear acceleration 715 and the distance covered 716. To do so the system receives from the IMU 174 data from the magnetometers 720, gyroscope 730 and accelerometers 740. The system then filters the data 711, fuses/integrates the data 712. From the fused data, the system detects the start of the sprint 713 by looking for the first step in the force data and from that information converts the IMU data into linear velocity 714, linear acceleration 715 and linear distance travelled 716.

If the force sensing device 151 data was received from a force sensing device 151 attached to a harness or from a force sensing device inline with the tether, then additional processing to remove the noise caused by the human moving in the Z direction (vertical) would be used. When the force sensing devices are located on the sled, since the sled does not move in the Z direction no filtering is necessary in the Z-plane.

Alternatively, the 1D load cells may be replaced with 2D (two direction) load cells. When using 2D load cells it would not be necessary to calculate the angle of the force generated using the IMU as the 2D load cells can provide sufficient information without the IMU. This if a 2D load cell is used the force sensing device would not need an IMU.

Figure 8:
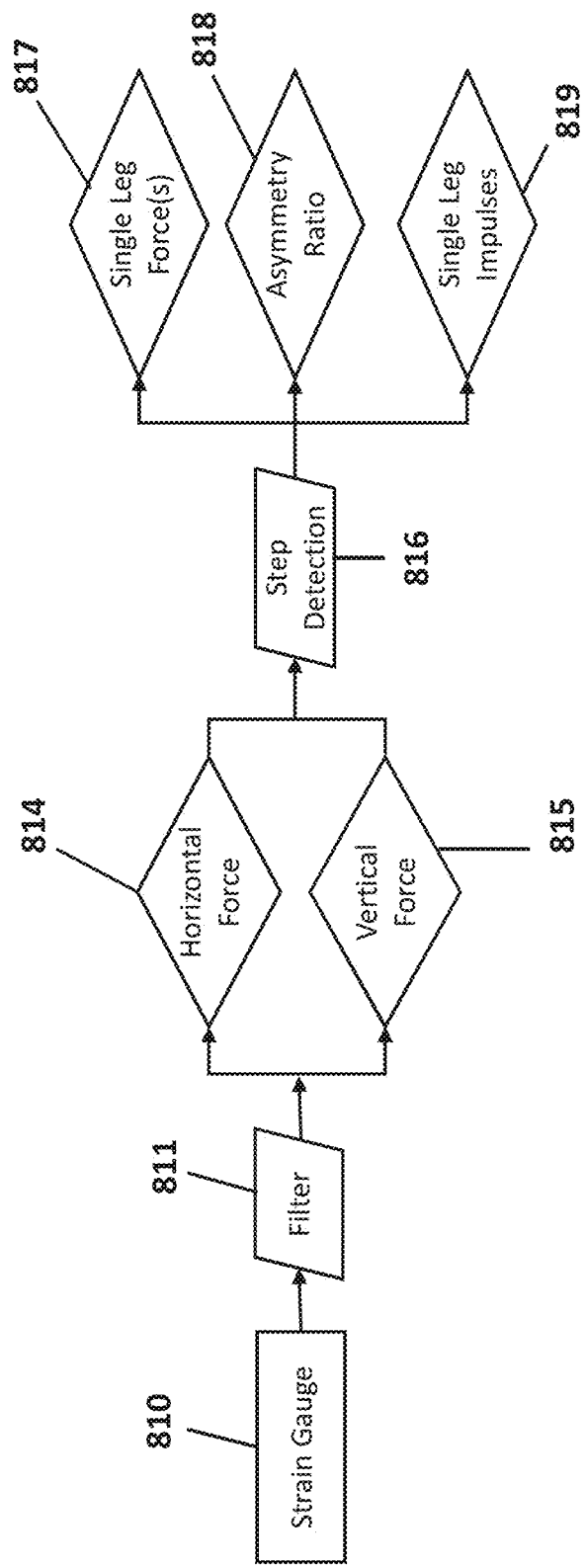
FIG. 8 is an alternative flow diagram of the data processing of the force sensing system data.

When using 2D load cells referring to FIG. 8 the software receives the load cell data 810, filters 811 the data to remove noise and produce a force measurement 812.

From the 2D load cells 810 the system receives data and applies a filter 811, in one embodiment a Kalman filter, the software then calculates horizontal force 814 and vertical force 815.

Using a peak detection algorithm each step is detected as left or right 916 and the maximum force at each step is calculated and the system displays the average force for left 817 and right 819 steps and the ratio 818 between left and right.

From the additional module 171 the system calculates linear velocity 714, linear acceleration 715 and the distance covered 716 in the manner described above.

When using two tethers and two force sensing devices 151 the measurements would be summed to get a global pulling force. Using two IMUs (one in each force sensing device 151) would give two angles of pull and the angles summed using trigonometry. If the standard 1D load cell was replaced by a 2D load cell then no IMU would be necessary within the force sensing device 151.

Distance may additionally or alternatively be calculated using distance sensing equipment including timing gates; UWB positioning technology; video; radar and lidar. The data obtained for these measurements can be used to enhance or replace the distance data from the IMU.

The system can provide the following measurements
1. Sprinting force and unilateral (i.e. single-leg) horizontal force horizontal force measured by the load cell.
2. Angle of pull measured by IMU.
3. Linear acceleration and velocity of sled measured by IMU expansion board.
4. Integration optimal training load parameters.

Further the system could be integrated on the basis of time with other technologies (e.g. video or radar) and may in an alternative embodiment provide other measurements including impulse and rate of force development.

The measurement system 170 may be provided separately from the sled or the sled and measurement system 170 provided together.

When provided separately for use with a user's existing sled the system would include:
one or more force measuring devices 151 including either a 2D load cell or a 1D load cell with an IMU and a transmitter
an additional IMU module 171 to be placed somewhere on the sled.

When used with a user's existing sledge a one-time calibration routine would be needed.

In a further alternative when the measurement system 170 is mounted or located in the harness, the harness incorporating the measurement system could be sold separately or with a sled. Likewise when the measurement system is located inline in the tether, the tether incorporating the measurement system 170 could be sold separately from the harness and the sled.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method for measuring physical exertion by a human user, the method comprising:
receiving strain data at a rate of at least 1000 samples per second, wherein the strain data measures strain on a load cell in response to force exerted by the human user on the load cell during a current performance of an exercise by the human user;
converting the strain data into force-time data of force as a function of time;
calculating a current value of one or more metrics based on the force-time data, the metrics including a rate of force development;
comparing the current value with one or more prior values of the metrics stored in a database, wherein the prior values of the metric are calculated based on force-time data from prior performances of the exercise; and
providing information to the human user based on the comparison of the current and prior values of the metrics, the information relating to performance of the exercise.

2. The method of claim 1 wherein, as stored in the database, each prior value of the metric is associated with a human who made the prior performance of the exercise, and with a date of the prior performance.

3. The method of claim 1 wherein a mobile device operated by the human user is used to receive the strain data and to provide the information to the human user, and the prior values of the metric are stored in a cloud-based database that is remote from the mobile device but accessible by the mobile device.

4. The method of claim 1 further comprising:
determining a current force event curve based on the force-time data from the current performance of the exercise; and comparing the current force event curve with one or more prior force event curves stored in the database, wherein the prior force event curves are based on the force-time data from the prior performances of the exercise, and the information provided to the human user is further based on the analysis of the current and prior force event curves.

5. The method of claim 1 wherein the exercise is part of a rehabilitation, therapy, or geriatric treatment.

6. The method of claim 1 wherein the prior values of the metric are calculated based on force-time data from prior performances of the exercise by the same human user.

7. The method of claim 6 wherein comparing the current and prior values of the metric comprises determining whether the current value of the metric is a personal best for the human user.

8. The method of claim 6 wherein comparing the current and prior values of the metric comprises comparing the current value of the metric against the human user's personal best value for the metric.

9. The method of claim 6 wherein the method is repeated for repetitions of the exercise by the human user over time.

10. The method of claim 6 wherein the prior values of the metric are calculated based on force-time data from prior performances of the exercise repeated by the same human user over time, and comparing the current and prior values of the metric comprises assessing the human user's improvement over time at performing the exercise.

11. The method of claim 6 wherein the prior values of the metric are calculated based on force-time data from prior performances of the exercise repeated by the same human user over time, and providing information to the human user comprises displaying progress over time at performing the exercise.

12. The method of claim 6 wherein the current performance of the exercise occurs after an injury that affects performance of the exercise, and the prior performances of the exercise occurred before the injury.

13. The method of claim 1 wherein the prior values of the metric are calculated based on force measurements from prior performances of the exercise by other human users.

14. The method of claim 13 wherein the other human users are professional athletes.

15. The method of claim 13 wherein the exercise is physical rehabilitation for an injury, and the other human users are other humans who have rehabilitated from the same injury.

16. The method of claim 1 wherein the exercise is part of a training regimen; and providing information to the human user comprises modifying the training regimen based on the comparison of the current and prior values of the rate of force development.

17. The method of claim 1 wherein the information provided to the human user comprises amount of weight for at least one of the other exercises.

18. The method of claim 17 wherein the amount of weight for the other exercise is determined by machine learning or artificial intelligence applied to the current and prior values of the metric.

19. The method of claim 16 wherein modifying the training regimen based on the comparison of the current and prior values of the rate of force development is performed by machine learning or artificial intelligence algorithms.

20. The method of claim 16 wherein modifying the training regimen based on the comparison of the current and prior values of the rate of force development comprises: identifying correlations or patterns between the current values and baselines established by the prior values.

21. The method of claim 16 wherein the training regimen is a training regimen for physical rehabilitation of an injury.

* * * * *